United States Patent
Steuer et al.

(10) Patent No.: US 9,303,102 B2
(45) Date of Patent: Apr. 5, 2016

(54) PROCESS FOR PREPARING POLYVINYL ACETAL BY ACID-CATALYZED REACTION

(71) Applicant: KURARAY EUROPE GMBH, Frankfurt (DE)

(72) Inventors: Martin Steuer, Liederbach (DE); Masako Katayama, Okayama pref. (JP)

(73) Assignee: KURARAY EUROPE GMBH, Frankfurt (DE)

( * ) Notice: Subject to any disclaimer, the term of this patent is extended or adjusted under 35 U.S.C. 154(b) by 238 days.

(21) Appl. No.: 14/102,786

(22) Filed: Dec. 11, 2013

(65) Prior Publication Data

US 2014/0100333 A1 Apr. 10, 2014

Related U.S. Application Data

(62) Division of application No. 12/971,425, filed on Dec. 17, 2010, now abandoned.

(30) Foreign Application Priority Data

Dec. 18, 2009 (EP) ..................... 09179814

(51) Int. Cl.
*C08F 8/28* (2006.01)
*C08F 8/00* (2006.01)
*B32B 17/10* (2006.01)

(52) U.S. Cl.
CPC .............. *C08F 8/28* (2013.01); *B32B 17/10761* (2013.01); *Y10T 428/3163* (2015.04)

(58) Field of Classification Search
CPC ....... B32B 17/10761; C08F 8/28; C08F 8/48; C08F 16/06
See application file for complete search history.

(56) References Cited

U.S. PATENT DOCUMENTS

| 4,970,253 A | 11/1990 | Hermann |
| 2003/0040575 A1 | 2/2003 | Stark |

FOREIGN PATENT DOCUMENTS

| GB | 2 007 677 | 5/1979 |

*Primary Examiner* — David W Wu
*Assistant Examiner* — Marie Reddick
(74) *Attorney, Agent, or Firm* — Millen, White, Zelano & Branigan, P.C.

(57) ABSTRACT

The invention relates to polyvinyl acetals obtainable by reacting polyvinyl alcohol with at least one aldehyde with a degree of acetalization of at least 75 mol %, characterized by an OH blockiness of the polyvinyl acetal, defined as a quotient from the number of methylene groups of two adjacent alcohol sequences (VV) and the sum of the number of methylene groups of adjacent alcohol/acetal sequences and acetal/acetal sequences (VB+BB), of more than 0.151, as well as a process for the preparation thereof.

14 Claims, 2 Drawing Sheets

PROCESS FOR PREPARING POLYVINYL ACETAL BY ACID-CATALYZED REACTION

This application is a divisional of application Ser. No. 12/971,425, filed Dec. 17, 2010

TECHNICAL FIELD

The invention relates to polyvinyl acetals with high flowability, a process for their preparation and their use in plasticizer-containing films.

PRIOR ART

Polyvinyl acetals, in particular polyvinyl butyral have long been known in the fields of architectural and automobile construction as a basic material for the production of intermediate layer films for laminate safety glasses as well as adhesive films for photovoltaic modules.

Polyvinyl acetals and their reaction products are materials produced on an industrial scale that, over the years, have had to be adapted to many different application profiles. The molecular structure of the polymer chain was studied in this connection with regard to composition (degree of acetalisation, residual acetate content and residual alcohol content), chain length, aldehyde used and compatibility with different plasticizers. The object of these studies is often merely the polyvinyl acetal however, and not the processability or adjustment of specific properties of the reaction products.

A further aspect when studying polyvinyl acetals is their processability for forming plasticizer-containing films and their further processing in turn. Plasticizer-containing films based on polyvinyl butyral are generally processed with glass or other plastics materials at increased temperature and increased/reduced pressure to form corresponding laminates. Particularly in the field of automobile construction or when producing photovoltaic modules, the laminate components to be assembled are not planar or else have a constant thickness but, for example, electric supply lines, solar cells, sensors or resistance wires must be integrated. This presupposes that the plasticizer-containing film exhibits sufficient flowability at conventional lamination temperatures in such a way that any unevenness or imperfections are enclosed or encapsulated in a bubble-free and streak-free manner.

A lack of flowability of films can be offset to a certain extent by raising processing temperatures or extending processing times. However, in industrial processes the increase in processing temperature and/or the extension of machine cycle times is undesirable since the energy efficiency or capacity utilisation of the production plants is thus lowered.

The plasticizer content of the film could also be raised in order to improve flowability. However, this is not always possible for reasons of compatibility with the respective polyvinyl acetal and generally also leads to increased inherent adhesiveness of the film. This reduces its processability and is generally undesirable.

The preparation of polyvinyl acetals with improved flowability is known in GB 2007677. In the process described in this instance the acidic reaction mixture is neutralised with the aid of bases upon reaching the final temperature. The sequence of repeating units in the polyvinyl acetal (alcohol, acetal and acetate groups) is thus frozen and is not adjusted to the thermodynamic balance at the final temperature. Furthermore, emulsifiers are used in the acetalisation reaction and affect the reaction and the sequence of the repeating units in the polyvinyl acetal. Furthermore, the flowability of the polyvinyl acetals described in GB 2007677 improves with an increasing degree of acetalisation (butyraldehyde drained weight), which has a detrimental effect on the obtainment of highly acetalised polyvinyl acetals with a degree of acetalisation over 75 mol %.

The preparation of polyvinyl acetals with improved flowability is also described in U.S. Pat. No. 4,970,245. However, in this instance a low acetalisation temperature is used in such a way that the sequence of repeating units in the polyvinyl acetal is not adjusted to the thermodynamic balance. Furthermore, emulsifiers are also used in this instance.

The object of the present invention was therefore to provide polyvinyl acetals or plasticizer-containing films produced therefrom with improved flowability.

It was surprisingly found that the rheological properties of polyvinyl acetal or plasticizer-containing films produced therefrom can be adjusted via the secondary structure of the polymer chain. This can be examined in a simple manner by $^{13}$C-NMR measurements.

ILLUSTRATION OF THE INVENTION

The present invention therefore relates to polyvinyl acetals obtainable by reacting at least one polyvinyl alcohol with at least one aldehyde with a degree of acetalisation of the polyvinyl alcohols of at least 75 mol %, characterised by an OH blockiness of the polyvinyl acetal, defined as a quotient from the number of methylene groups of two adjacent alcohol sequences (VV) and the sum of the number of methylene groups of adjacent alcohol/acetal sequences and acetal/acetal sequences (VB+BB), of more than 0.151.

The invention further relates to a process for the preparation of polyvinyl acetals with the aforementioned OH blockiness and degree of acetalisation by acid-catalysed reaction of at least one polyvinyl alcohol with at least one aldehyde, characterised by the following process steps:
  a) reacting the polyvinyl alcohol with the aldehyde at a temperature of 0 to 20° C.,
  b) completing the reaction of a) by heating the reaction mixture to 68 to 90° C.,
  c) cooling the reaction mixture to 15 to 25° C. and separating the precipitated polyvinyl acetal,
  d) neutralising the polyvinyl acetal separated from the reaction mixture.

The methylene groups VV, VB and BB considered within the scope of this invention are shown in the following excerpt of the formula of a polyvinyl butyral chain:

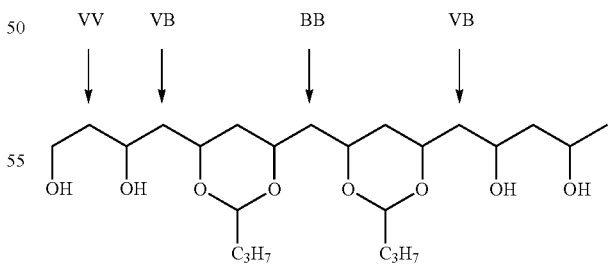

The OH blockiness of the polyvinyl acetals according to the invention is calculated from the quotient VV/(VB+BB) and can be ascertained by $^{13}$C-NMR measurements, as illustrated hereinafter.

Polyvinyl acetals according to the invention are obtainable by reacting at least one polyvinyl alcohol with at least one aldehyde with acid catalysis. This reaction is known in principle to the person skilled in the art and can be taken, for example, from WO 2009/132987 or EP 09175666.8.

When preparing polyvinyl acetals at least one polyvinyl alcohol is normally first dissolved in water with heating and placed in a reaction vessel at a temperature of approx. 5 to 20° C. In a first process variant an acid (HCl, HNO$_3$ or H$_2$SO$_4$), or in a further variant one or more aldehydes with 2 to 10 carbon atoms (for example acetaldehyde and/or butyraldehyde) are added for this purpose. Butyraldehyde is preferably used as aldehyde, with production of polyvinyl butyral.

The process according to the invention is preferably carried out in the absence of emulsifiers or surfactants, for example sulphonic acid salts such as the sodium salt of dodecyl sulphonic acid, which is used frequently in the prior art.

Depending on the process variant, at least one aldehyde is added at the given temperature to form a polyvinyl alcohol/acid mixture or an acid is added to form a polyvinyl alcohol/aldehyde mixture. The polyvinyl acetal produced precipitates either during or after the addition. The acid or aldehyde can be added in process step a) at different dosing times and/or with a dosing pause.

In order to complete the reaction the reaction mixture is heated in process step b), preferably to 68 to 80° C. and held at this temperature for a specific period of time. In addition to completion of the acetalisation reaction, intramolecular re-acetalisation can also take place during this 'hot modification' with formation of acetal and alcohol domains.

It is assumed that the flow behaviour of polyvinyl acetal is highly dependent on the formation of vinyl alcohol domains. This can be ascertained particularly effectively by $^{13}$C-NMR tests, as described in the measuring procedures.

Within the scope of the present invention the domain formation of vinyl alcohol groups is ascertained by the 'OH blockiness' via $^{13}$C-NMR measurements. The OH blockiness of polyvinyl acetal according to the invention is preferably greater than 0.151, preferably greater then 0.16, particularly preferably greater than 0.17 and in particular greater than 0.18, in each case with an upper limit for OH blockiness of 0.3.

The flowability of polyvinyl acetal according to the invention can additionally also be expressed via its solution viscosity in a 5% by weight solution in ethanol. This is preferably less than 75 mPas and particularly preferably less than 70 mPas.

The process according to the invention is therefore preferably carried out at a temperature in process step b) of at least 68° C., particularly of more than 72° C., in each case with an upper limit of 90° C. or 80° C. Irrespective of this, the temperature in process step b) may be kept constant over a period of at least 60 min, preferably at least 80 and particularly more than 100 min, in each case with an upper limit for the holding time of 600 min.

Acetalisation of polyvinyl alcohols is an acid-catalysed balance reaction, acetal groups being formed as a function of temperature and then breaking down again. A polyvinyl acetal is formed by the balance reaction with the sequence according to the invention of repeating units in the polyvinyl acetal (alcohol, acetal and acetate groups), defined by the quotient from the number of methylene groups of two adjacent alcohol sequences (VV) and the sum of the number of methylene groups from adjacent alcohol/acetal sequences and acetal/acetal sequence (VB+BB), abbreviated to OH blockiness. The sequence according to the invention is only obtained with a balance reaction in accordance with step b) of the process according to the invention with sufficient time and heat.

As a result of cooling the reaction mixture in step c), the sequence of repeating units in the polyvinyl acetal set in step c) is frozen and is no longer changed by the additional removal of the acid catalyst. The thermodynamic balance of the sequence of repeating units in the polyvinyl acetal obtained in step b) is thus fixed.

In step d) of the process according to the invention the polyvinyl acetal separated from the reaction mixture is neutralised. This may be achieved by washing with water or by adding bases, such as KOH, NaOH, Mg(OH)$_2$ or epoxides.

Polyvinyl acetals according to the invention preferably have a residual acetate content of 1.0-8 mol %, particularly preferably 1.0 to 5.0 and in particular 1.0 to 2.0 mol %. The residual acetate content of the polyvinyl acetals according to the invention is identical to that of the polyvinyl alcohols used.

In a further variant of the invention the polyvinyl acetals according to the invention have increased molecular weight and increased solution viscosity, which must lie within the above limits, as a result of crosslinking via carboxyl groups, polyaldehydes, glutardialdehydes or glyoxylic acid.

Crosslinked polyvinyl acetals may be produced, for example by co-acetalisation of polyvinyl alcohols with polyaldehydes, glutardialdehyde or glyoxylic acid. 0.001 to 1% of the hydroxy groups originally contained in the polyvinyl acetal preferably react as a result of the crosslinking.

For example suitable crosslinking options for polyvinyl acetals are described in EP 1527107 B1 and WO 2004/063231 A1 (thermal self-crosslinking of carboxyl-group-containing polyvinyl acetals), EP 1606325 A1 (polyvinyl acetals crosslinked with polyaldehydes), EP 1622946 A1 (polyvinyl acetals crosslinked with glutardialdehyde) and WO 03/020776 A1 (polyvinyl acetals crosslinked with glyoxylic acid). Reference is made fully to the disclosure of these patent applications. Crosslinking of the polyvinyl acetal is ascertained macroscopically by increased molecular weight and increased viscosity of an ethanol solution compared to the uncrosslinked polyvinyl acetals.

The polyvinyl acetals according to the invention can be processed particularly effectively with conventional plasticizers to form plasticizer-containing films as a result of the improved flowability, for example expressed by solution viscosity. Films of this type are suitable for use in laminate glasses for the automobile and construction industries as well as for the production of photovoltaic modules.

The films produced with the polyvinyl acetals according to the invention preferably have a plasticizer content in the range from 18 to 32% by weight, preferably from 22 to 28% by weight (in each case based on the total formulation). Films of this type may contain one or more plasticizers that are common in this technical field and are known to the person skilled in the art. One or more plasticizers are particularly preferable, selected from the group of di-2-ethylhexyl sebacate, 1,2 cyclohexane dicarboxylic acid diisononyl ester, di-2-ethylhexyl adipate, di-2-ethylhexyl phthalate, dioctyl adipate, dihexyl adipate, dibutyl sebacate, di-2-butoxyethyl sebacate, triethyleneglycol-bis-2-ethylhexanoate, triethyleneglycol-bis-n-heptanoate, tetraethyleneglycol-bis-n-heptanoate, di-2-butoxyethyl adipate, di-2-butoxyethoxyethyl adipate.

In addition to plasticizers, the films produced with the polyvinyl acetals according to the invention may also contain adhesion regulators, such as the alkaline and/or alkaline earth salts of organic acids disclosed in WO 03/033583 A1. Potassium acetate and/or magnesium acetate have proven to be particularly suitable. The alkaline and/or alkaline earth metal salts can be used alone or in combination in an amount from 0 to 300 ppm, particularly 0 to 100 ppm.

The basic production of films based on plasticizer-containing polyvinyl acetals is known industrially and is described, for example, in EP 185863 B1 or EP 1118258 B1. The processing of these films is also known to the person skilled in the art and can be carried out in 'autoclave processes' at an increased pressure of 10 to 15 bar and at temperatures of 130 to 145° C. Alternatively, processing may be carried out in 'vacuum bag laminators', 'vacuum ring laminators' or 'vacuum laminators', for example in accordance with EP 123568 B1 at approx. 200 mbar and 130 to 145° C.

MEASURING PROCEDURES

The flow behaviour of the film is determined as the melt index (melt flow rate MFR) in accordance with ISO 1133 using a corresponding apparatus, for example from Göttfert, model MI2. The MFR value is given at the corresponding temperatures with the 2 mm nozzle with weight loadings of 21.6 kg, 10 kg or 2.16 kg in grams or milligrams every 10 minutes (g/10 min)

The polyvinyl alcohol and polyvinyl alcohol acetate contents of the polyvinyl acetals were determined in accordance with ASTM D 1396-92. The degree of acetalisation (=butyral content) can be calculated as the remaining portion from the sum of polyvinyl alcohol and polyvinyl acetate content established in accordance with ASTM D 1396-92 needed to make one hundred. Conversion from % by weight into mol % is achieved in accordance with formulae known to the person skilled in the art.

The metal ion content was determined by atomic absorption spectroscopy (AAS).

The solution viscosity of the polyvinyl acetals was measured in accordance with DIN 53015 at 20° C. in a mixture of 95 parts ethanol and 5 parts water. The solid content of the viscosity solution was 5% by weight.

The solution viscosity of the polyvinyl alcohols was measured in accordance with DIN 53015 at 20° C. in water. The solid content of the viscosity solution was 4% by weight.

The $^{13}$C-NMR measurements were carried out using a spectrometer of the LA 500 type from JEOL. 12% by weight solutions of PVB were produced in deuterated dimethyl sulphoxide (DMSO) in NMR tubes with a diameter of 10 mm. Chromium(III) acetylacetonate was added in an amount of 0.9% by weight as a relaxation agent. The NMR measurement was carried out in the NNE mode (gated decoupled mode) at 80° C. The signals were allocated in accordance with FIGS. 1 and 2. The horizontal axis in the figures represents the chemical shift in ppm (resonance frequency DMSO-d6: 39.5 ppm). The vertical axis represents resonance intensity. The absolute fraction of a structural unit can be ascertained from the spectra by integration of the corresponding signals in a manner known to the person skilled in the art.

Figure 1:
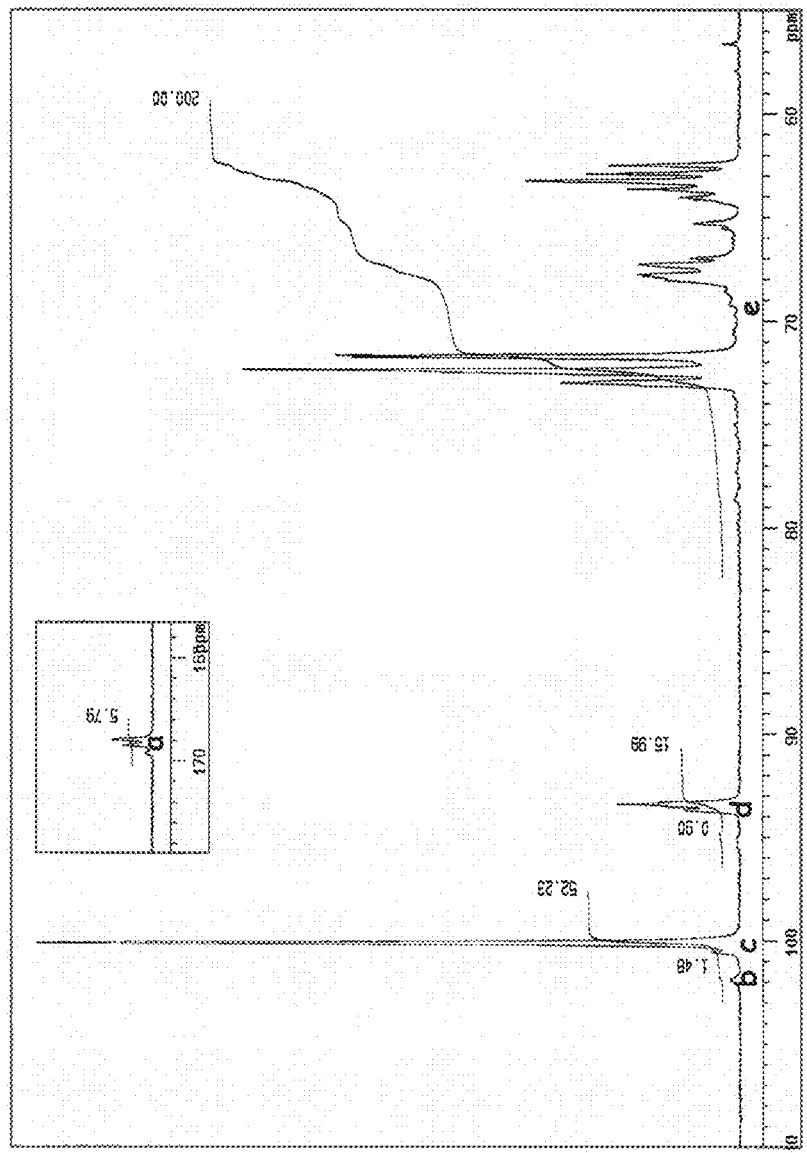
FIGS. 1 and 2 show the $^{13}$C-NMR measurements for a polyvinyl acetal according to the invention).
Figure 2:
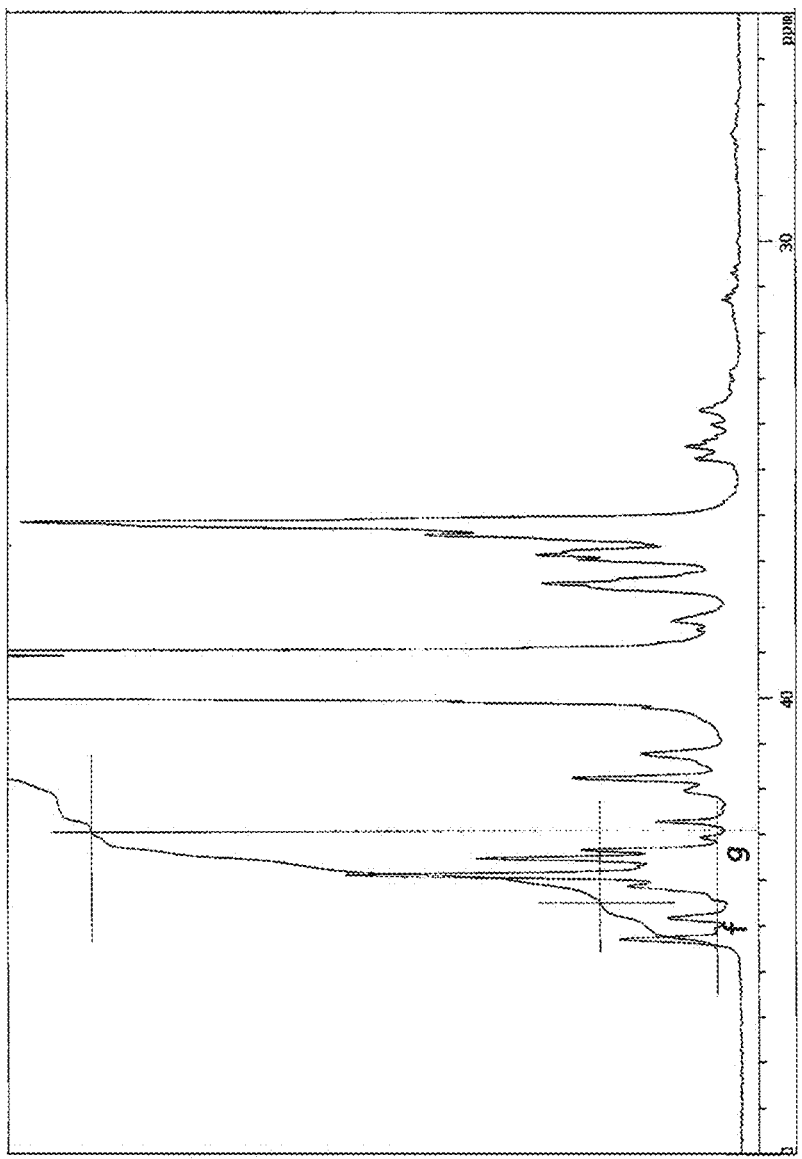

The integration limits of the resonance peak are shown in FIGS. 1 and 2 and can be inferred from the table below. Integration between chemical shifts is given in [ppm].

| | | Range |
|---|---|---|
| a | Carbonyl C-atom of the acetyl group | 168.5-170.5 |
| b | Methine C-atom of the 5-membered butyral ring | 101.6-102.4 |

-continued

| | | Range |
|---|---|---|
| c | Methine C-atom of the 6-membered butyral ring (meso form) | 98.5-101.6 |
| d | Methine C-atom of the 6-membered butyral ring (racemo form) | 91.5-94.5 |
| e | Methine C-atom of the main chain | 60-83 |
| f | Methylene C-atom of a VV-sequence | 44.6-46 |
| g | Methylene C-atom of VB and BB sequence | 42.9-44.6 |

The following expressions are used as a relative measure for the proportions of different structural units.

| Calculation method | |
|---|---|
| Butyral ring meso/racemo | |
| meso | c/(c + d) × 100 (%) |
| racemo | d/(c + d) × 100 (%) |
| HO blockiness | |
| VV/(VB + BB) | f/g |

EXAMPLES

DOA=dioctyl adipate
PVB=polyvinyl butyral with the given PVA content

Comparative Example 1

100 parts by weight of the polyvinyl alcohol, MOWIOL 28-99 (commercial product from Kuraray Europe GmbH), were dissolved in 1075 parts by weight of water with heating to 90° C. 75 parts by weight of n-butyraldehyde were added at a temperature of 40° C. and 75 parts by weight of 20% hydrochloric acid were added with stifling at a temperature of 12° C. within 6 min, after which the polyvinyl butyral (PVB) precipitated. The mixture was then held at 12° C. for a further 15 min with stifling, then heated to 60° C. within 80 min and was held at this temperature for 30 min. the PVB was separated after cooling to ambient temperature, washed neutral with water and dried. A PVB with a polyvinyl alcohol content of 15.9% by weight and a polyvinyl acetate content of 1.2% by weight was obtained.

380 g of PVB and 120 g of the plasticizer DOA were mixed in a laboratory mixer (manufacturer: Brabender, model 826801). The mixture obtained was extruded to form a flat film with a thickness of 0.8 mm. Extrusion was carried out using a double-screw extruder with screws rotating in opposite directions (manufacturer: Haake, system Rhecord 90), equipped with a melting pump and a sheet die. The cylinder temperature of the extruder was 220° C., the nozzle temperature was 150° C.

Comparative Example 2

66.3 parts by weight of n-butyraldehyde were used during polymer synthesis. The reaction mixture was held at 12° C. for a further 15 min with stirring following precipitation of the PVB, then heated to 65° C. within 80 min and held at this temperature for 60 min. For the rest, the procedure according to comparative example 1 was followed.

Example 1

63 parts by weight of n-butyraldehyde were used during polymer synthesis. The reaction mixture was kept at 12° C.

for a further 15 min with stirring following precipitation of the PVB, then heated to 69° C. within 80 min and held at this temperature for 120 min. For the rest, the procedure according to comparative example 1 was followed.

Example 2

The reaction mixture was held at 12° C. for a further 15 min with stirring following precipitation of the PVB, then heated to 73° C. within 80 min and held at this temperature for 120 min. For the rest, the procedure according to Example 1 was followed.

Example 3

65.1 parts by weight of n-butyraldehyde were used during polymer synthesis. For the rest, the procedure according to Example 1 was followed.

Example 4

During polymer synthesis 63.9 parts by weight of n-butyraldehyde were added at a temperature of 40° C. and 72.9 parts by weight of 30% nitric acid were added with stirring at a temperature of 12° C. within 6 min, after which the polyvinyl butyral (PVB) precipitated. For the rest, the procedure according to Example 1 was followed.

The properties of the polyvinyl acetals or films produced therewith according to the invention are shown in the table below.

It was found that mixtures of polyvinyl acetals according to the invention with a plasticizer exhibit considerably improved flowability, which can be observed by the considerably increased melt index compared to the comparative examples.

This property is advantageous for the subsequent processing of films. For this purpose every two films were laminated in a test configuration with two glass panels and a plurality of wires with a diameter of 0.2 mm laid between the films in a conventional autoclave process at a temperature of 130° C. and a pressure of 10 bar for one hour.

It was found that the films produced with polyvinyl acetals according to the invention encase the wires with no bubble formation. The films according to the comparative examples required a higher processing temperature of 140° C. or a longer processing time of 1.5 h.

The invention claimed is:

1. A process for preparing a polyvinyl acetal by acid-catalyzed reaction of at least one polyvinyl alcohol with at least one aldehyde, said process comprising:
   a) reacting said at least one polyvinyl alcohol with said at least one aldehyde at a temperature of 0 to 20° C.,
   b) completing the reaction of a) by heating the resultant reaction mixture to 68 to 90° C.,
   c) cooling the resultant reaction mixture to 15 to 25° C. and separating the polyvinyl acetal, and
   d) neutralizing the polyvinyl acetal separated from the reaction mixture; and
   wherein the resultant polyvinyl acetal has an OH blockiness, defined as a quotient from the number of methylene groups of two adjacent alcohol sequences (VV) and the sum of the number of methylene groups of adjacent alcohol/acetal sequences and acetal/acetal sequences (VB+BB), of more than 0.151.

2. The process according to claim 1, wherein the temperature in b) is maintained over a period of at least 60 min.

3. The process according to claim 1 wherein the temperature in b) is 68° C. to 80° C.

4. The process according to claim 1, wherein said process is conducted in the absence of emulsifiers or surfactants.

5. The process according to claim 1, said at least one aldehyde is butyraldehyde.

6. The process according to claim 1, wherein said polyvinyl acetal has a residual acetate content of 1.0 to 8 mol %.

7. The process according to claim 1, wherein said polyvinyl acetal has an OH blockiness of from greater than 0.16 up to 0.3.

8. The process according to claim 1, wherein said polyvinyl acetal has an OH blockiness of from greater than 0.17 up to 0.3.

9. The process according to claim 1, wherein said polyvinyl acetal has an OH blockiness of from greater than 0.18 up to 0.3.

10. The process according to claim 1, wherein said polyvinyl acetal has a residual acetate content of 1.0 to 5.0 mol %.

11. The process according to claim 1, wherein said polyvinyl acetal has a residual acetate content of 1.0 to 2.0 mol %.

12. The process according to claim 1, wherein the temperature in b) is maintained over a period of at least 80 min. up to 600 min.

|  | VB 1 | VB 2 | B 1 | B 2 | B 3 | B 4 |
| --- | --- | --- | --- | --- | --- | --- |
| PVB properties |  |  |  |  |  |  |
| Final temperature [° C.] | 60 | 65 | 69 | 73 | 69 | 69 |
| Holding time at final temperature [min] | 30 | 60 | 120 | 120 | 120 | 120 |
| Polyvinyl alcohol content PVB [w %] | 15.9 | 16.2 | 16.4 | 16.2 | 15.4 | 14.7 |
| Polyvinyl acetate content PVB [w %] | 1.2 | 1.6 | 1.3 | 1.3 | 1.5 | 1.5 |
| Degree of acetalisation [w %] | 82.8 | 82.2 | 82.4 | 82.5 | 83.1 | 83.8 |
| Degree of acetalisation [mol %] | 75.6 | 75 | 75 | 75.2 | 76.1 | 77.1 |
| meso (13 C-NMR) [%] | 71.5 | 72 | 72.7 | 72.8 | 71.7 | 72.5 |
| racemo (13 C-NMR) [%] | 28.5 | 28 | 27.3 | 27.2 | 28.3 | 27.5 |
| meso/racemo | 2.5 | 2.6 | 2.7 | 2.7 | 2.5 | 2.6 |
| OH blockiness VV/(BV + BB) (13C-NMR) | 0.1291 | 0.1509 | 0.1769 | 0.1809 | 0.1621 | 0.1579 |
| Viscosity PVB, 5% sol. in ethanol [mPas] | 105 | 77.8 | 70 | 68.5 | 68.8 | 68.2 |
| Film properties |  |  |  |  |  |  |
| DOA content [w %] | 24 | 24 | 24 | 24 | 24 | 24 |
| MFR 100/2 mm/21.6 kg [mg/10 min] | 294 | 426 | 554 | 552 | 611 | 713 |
| MFR 120/2 mm/10 kg [mg/10 min] | 254 | 382 | 463 | 439 | 514 | 584 |
| MFR 130/2 mm/10 kg [mg/10 min] | 524 | 834 | 886 | 1026 | 848 | 1125 |
| MFR 190/2 mm/2.16 kg [g/10 min] | 0.62 | 1.06 | 1.55 | 1.56 | 1.5 | 1.84 |

13. The process according to claim 1, wherein the temperature in a) is 12° C. to 20° C.

14. The process according to claim 1, wherein the polyvinyl acetal has a melt flow rate (MFR) value, determined at the 100° C. using a 2 mm nozzle with weight loading of 21.6 kg, of 552-713 mg/10 min.

* * * * *